United States Patent
Wang

(10) Patent No.: US 7,797,920 B2
(45) Date of Patent: Sep. 21, 2010

(54) DRIVE CHAIN AND TOOL DEVICE FOR ASSEMBLING OR DISASSEMBLING THE SAME

(75) Inventor: Tzu-Feng Wang, Tainan Hsien (TW)

(73) Assignee: AMC Chain Industrial Co., Ltd., Yung-Kang (TW)

( * ) Notice: Subject to any disclaimer, the term of this patent is extended or adjusted under 35 U.S.C. 154(b) by 130 days.

(21) Appl. No.: 12/082,897

(22) Filed: Apr. 14, 2008

(65) Prior Publication Data

US 2009/0069136 A1    Mar. 12, 2009

(30) Foreign Application Priority Data

Sep. 12, 2007    (TW) .............................. 96215296 U

(51) Int. Cl.
   *B21L 21/00*    (2006.01)
(52) U.S. Cl. .............................. 59/7; 59/11; 29/243.53; 29/243.54
(58) Field of Classification Search ....................... 59/7, 59/11, 35.1; 29/243.53, 29.54, 251
   See application file for complete search history.

(56) References Cited

U.S. PATENT DOCUMENTS

| 2,783,611 | A | * | 3/1957 | Simpkin et al. ................... 59/7 |
| 2,826,893 | A | * | 3/1958 | Falk et al. ......................... 59/7 |
| 3,553,960 | A | * | 1/1971 | Ellefson ......................... 59/11 |
| 4,506,501 | A | * | 3/1985 | DeVall et al. .................. 29/251 |
| 4,833,875 | A | * | 5/1989 | Buermann, Jr. et al. .......... 59/7 |
| 5,203,158 | A | * | 4/1993 | Bowers ............................. 59/7 |
| 5,463,862 | A | * | 11/1995 | Reisenauer .............. 29/243.53 |
| 7,254,935 | B1 | * | 8/2007 | Huang ............................... 59/7 |

* cited by examiner

*Primary Examiner*—David B Jones
(74) *Attorney, Agent, or Firm*—David N. Lathrop

(57) ABSTRACT

A drive chain includes two end chain components and a connecting plate. Each of the end chain components has a pin hole and a connecting pin. The connecting pin includes a main segment inserted into the pin hole and having a diameter, an anchoring end segment axially spaced apart from the main segment and having a diameter, and a constricted neck extending between the main segment and the anchoring end segment. The connecting plate has two spaced anchoring holes each having a diameter that is originally smaller than the diameter of the main segment and larger than the diameter of the anchoring end segment. The main segment of the connecting pin is force-fitted in a corresponding one of the anchoring holes so that the end chain components are joined to each other. A tool device to assemble or disassemble the drive chain is also disclosed.

13 Claims, 14 Drawing Sheets

DRIVE CHAIN AND TOOL DEVICE FOR ASSEMBLING OR DISASSEMBLING THE SAME

CROSS-REFERENCE TO RELATED APPLICATION

This application claims priority of Taiwanese Application No. 096215296, filed on Sep. 12, 2007.

BACKGROUND OF THE INVENTION

1. Field of the Invention

The invention relates to a drive chain, more particularly to a drive chain having improved structural strength. The invention also relates to a tool device, more particularly to a tool device for assembling or disassembling the drive chain.

2. Description of the Related Art

Referring to FIGS. 1, 2, and 3, a conventional drive chain usually includes a plurality of parallel pairs of inner chain plates 721, a plurality of parallel pairs of outer chain plates 73, two end chain components 72, and an end-chain-component-connecting unit 8. The end chain components 72 are formed of two inner chain plates 721. The end-chain-component-connecting unit 8 includes a connecting plate 82, two connecting pins 81, and an anchoring plate 83. The end-chain-component-connecting unit 8 is used together with one of the outer chain plates 73 to interconnect the end chain components 72 so as to assemble the drive chain in a form of a loop.

In assembling the drive chain, the connecting pins 81 penetrate through one of the outer chain plates 73, the end chain components 72, and the connecting plate 82 sequentially so that the connecting pins 81 extend out of the connecting plate 82 and are anchored with the anchoring plate 83 to finish the assembly.

In order to facilitate assembly, the connecting plate 82 is provided with two anchoring holes 822 each having a diameter (a1) slightly larger than a diameter (a2) of each of the connecting pins 81. Therefore, there is a gap between the connecting plate 82 and each of the connecting pins 81, which results in fatigue of the connecting plate 82 due to the relative collision of the connecting plate 82 and the connecting pins 81 in use. Furthermore, since the diameter (a1) of each of the anchoring holes 822 of the connecting plate 82 should be larger than the diameter (a2) of each of the connecting pins 81, the peripheral width (d) of the connecting plate 82 may be reduced, which in turn reduces the mechanical strength of the connecting plate 82.

SUMMARY OF THE INVENTION

Therefore, an object of the present invention is to provide a drive chain having improved structural strength.

Another object of the present invention is to provide a tool device for assembling or disassembling the drive chain.

Accordingly, in a first aspect of this invention, a drive chain includes two end chain components and a connecting plate. Each of the end chain components has a pin hole and a connecting pin. The connecting pin of each of the end chain components includes a main segment inserted into the pin hole and having a diameter, an anchoring end segment axially spaced apart from the main segment, extending outwardly of the pinhole, and having a diameter, and a constricted neck extending outwardly of the pin hole and disposed between the main segment and the anchoring end segment. The connecting plate has two spaced anchoring holes each having a diameter that is originally smaller than the diameter of the main segment and larger than the diameter of the anchoring end segment. The main segment of the connecting pin is force-fitted in a corresponding one of the anchoring holes so that the end chain components are joined to each other.

In a second aspect of this invention, a tool device for assembling or disassembling two end chain components of a drive chain includes a base seat assembly, a drive mechanism, and a pressing mechanism. The base seat assembly includes a first side wall, and a positioning wall spaced apart from the first side wall and adapted to position the end chain components. The drive mechanism includes a drive unit movable relative to the base seat assembly and disposed on one side of the positioning wall opposite to the first side wall. The pressing mechanism is mounted movably between the positioning wall and the drive mechanism, and includes a pressing seat actuated by the drive mechanism to move toward the first side wall and adapted to press the end chain components against the first side wall.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
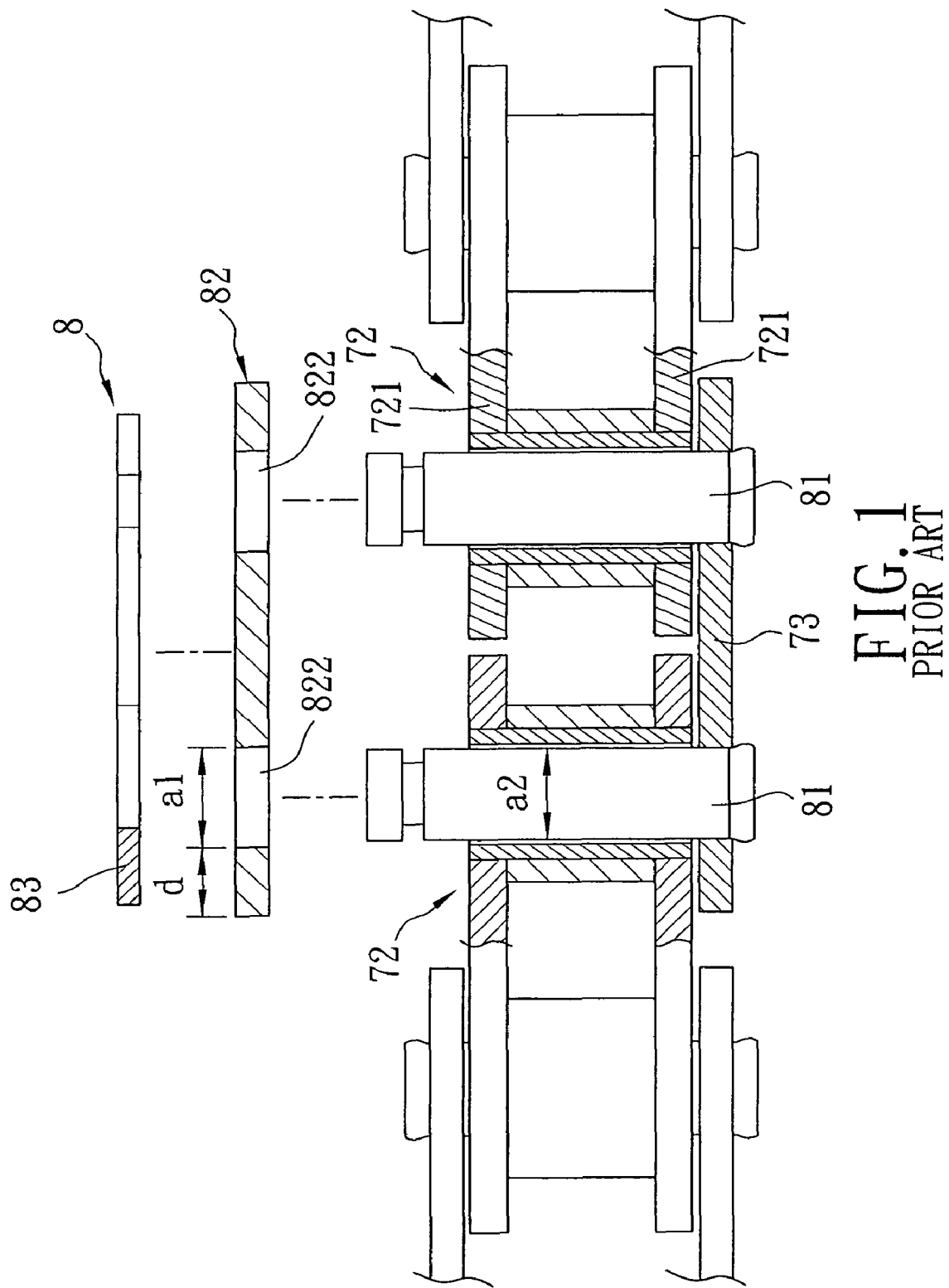
FIG. 1 is a fragmentary exploded partly cross-sectional schematic view of a conventional drive chain.
Figure 2:
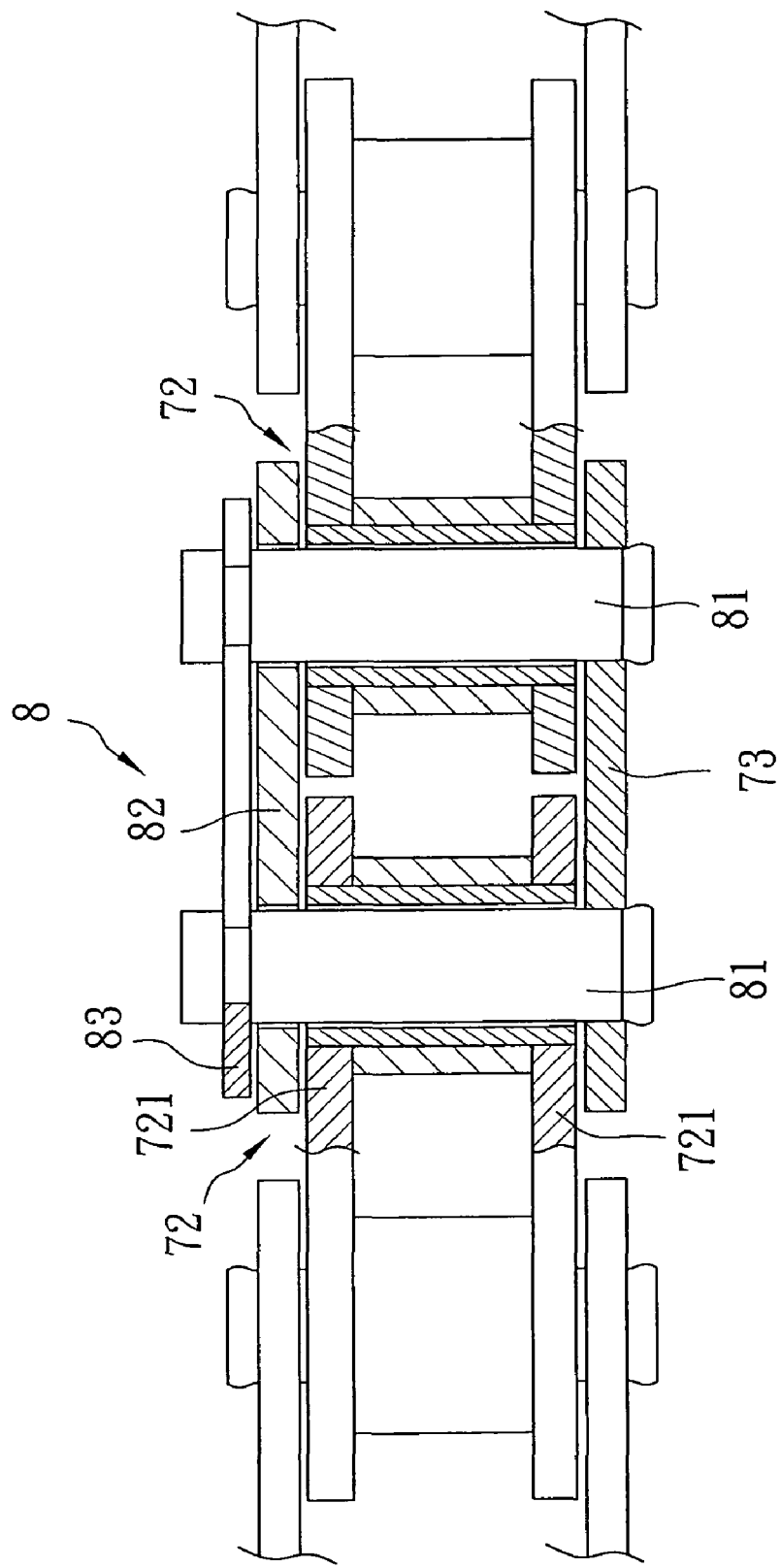
FIG. 2 is a fragmentary partly cross-sectional schematic view of the conventional drive chain.
Figure 3:
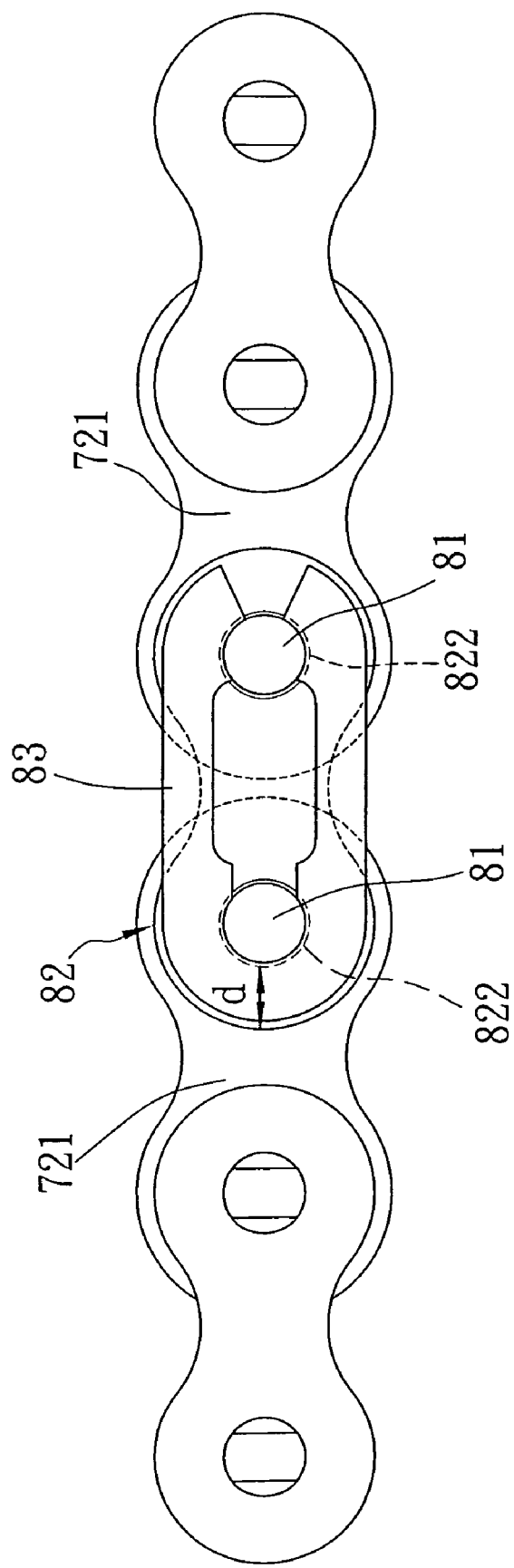
FIG. 3 is a fragmentary top view of the conventional drive chain.

Before the present invention is described in greater detail, it should be noted that like elements are denoted by the same reference numerals throughout the disclosure.

Figure 4:
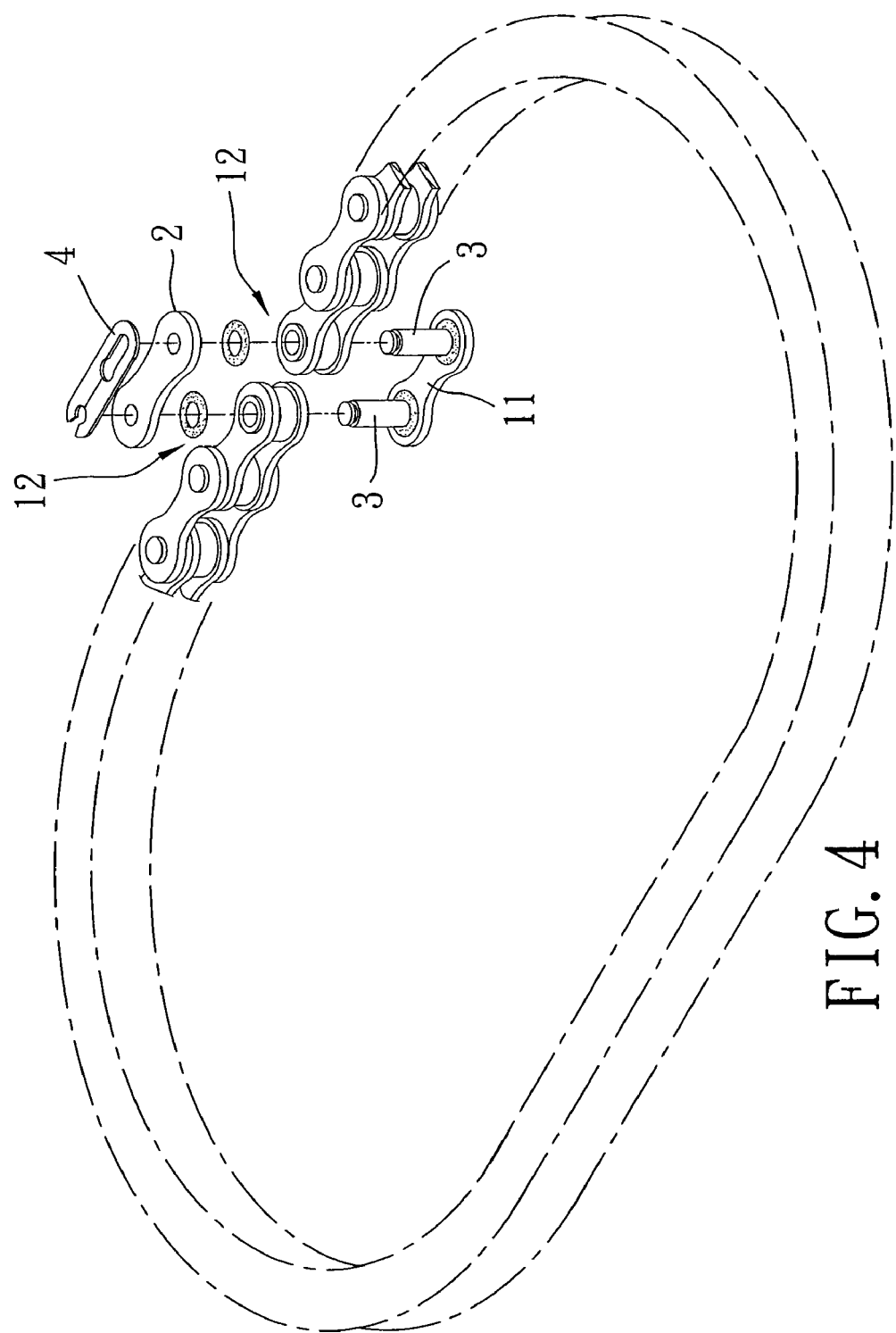
FIG. 4 is a fragmentary exploded perspective view of the preferred embodiment of the drive chain according to this invention.
Figure 5:
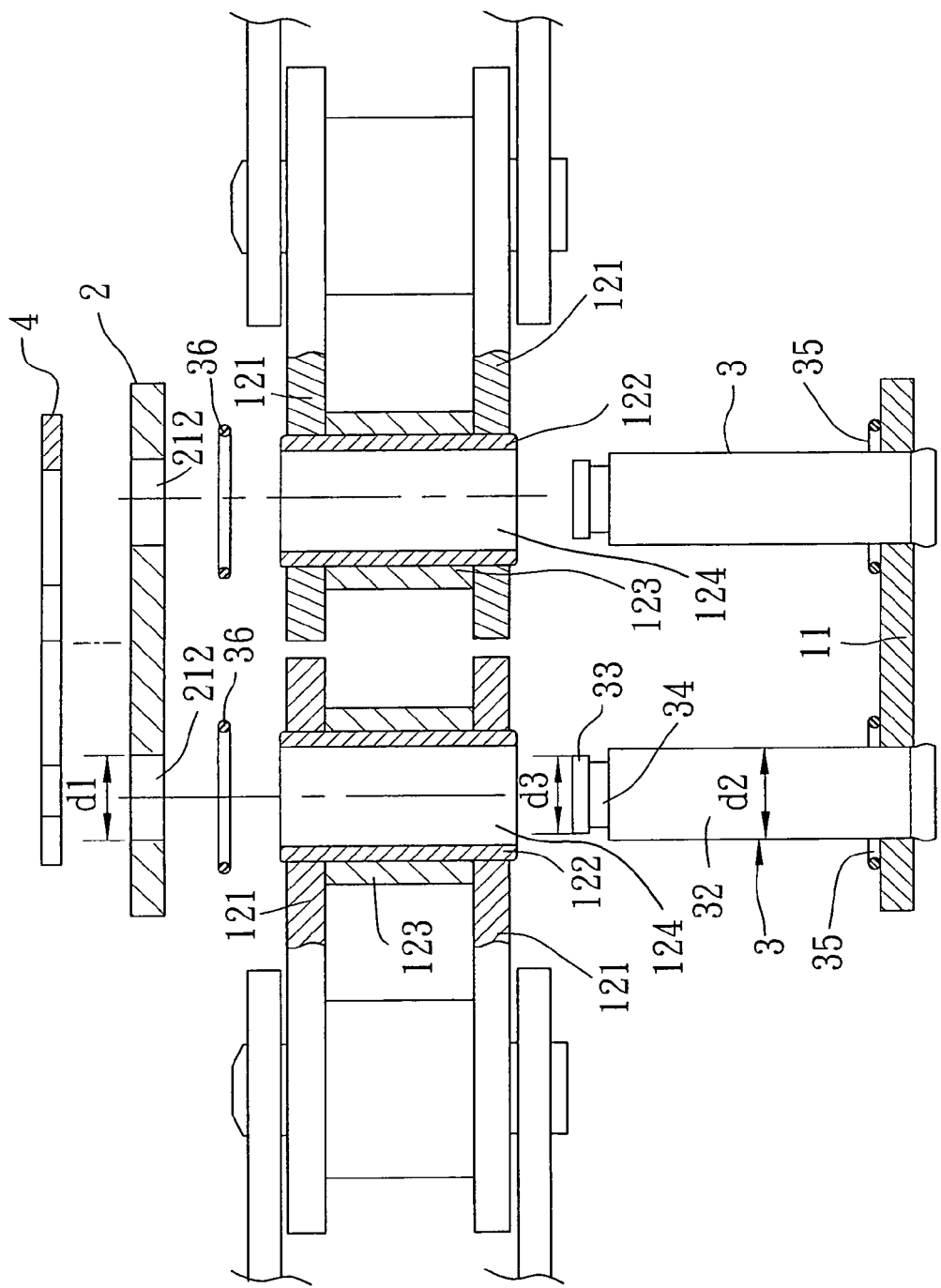
FIG. 5 is a fragmentary exploded partly cross-sectional schematic view of the preferred embodiment.
Figure 6:
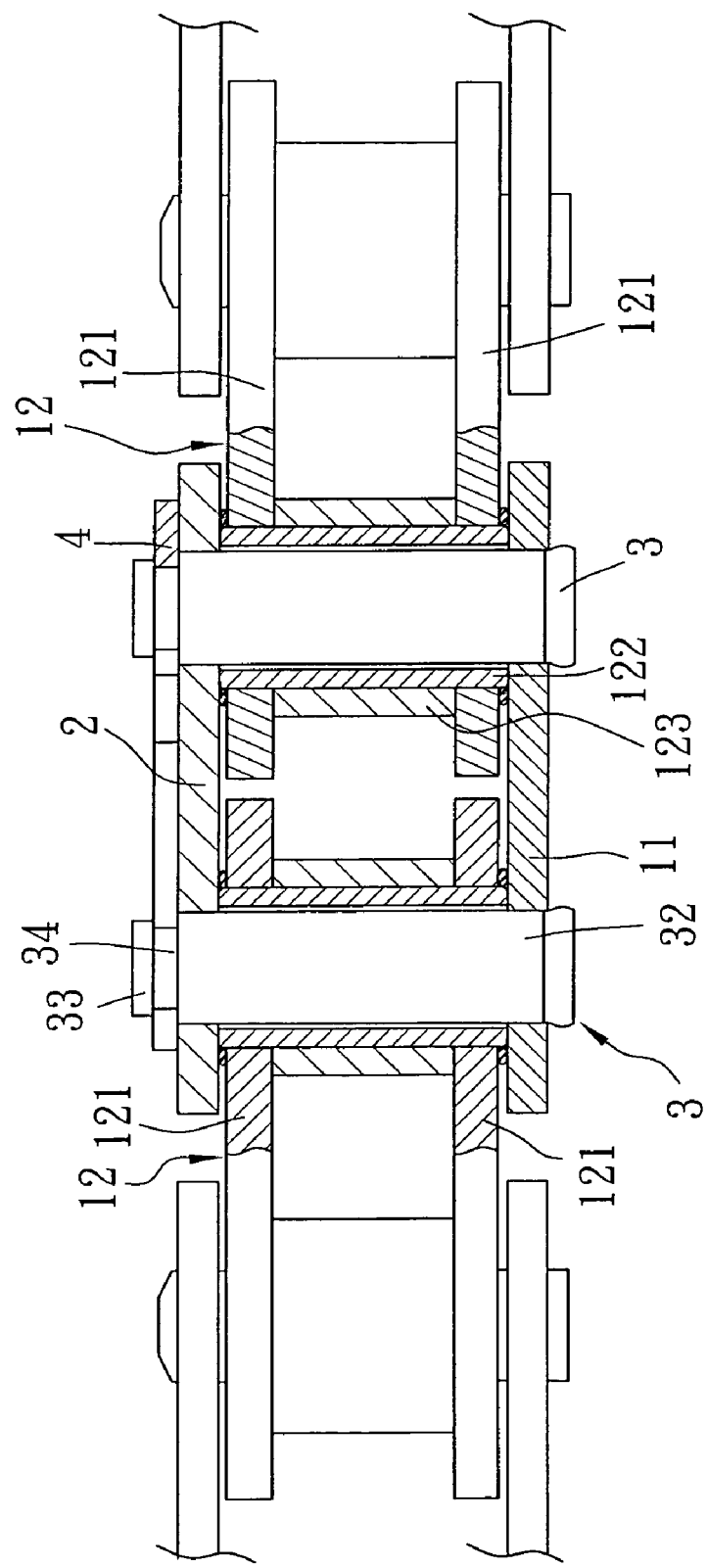
FIG. 6 is a fragmentary partly cross-sectional schematic view of the preferred embodiment.

Referring to FIGS. 4, 5, and 6, the preferred embodiment of the drive chain according to this invention is shown to include two end chain components 12, a first connecting plate 2, an anchoring plate 4, a pair of first packing rings 36, a pair of second packing rings 35, and a second connecting plate 11.

Each of the end chain components 12 has two inner chain plates 121, a bushing 122, a roller 123 sleeved on the bushing 122, a pin hole 124 defined by the bushing 122, and a connecting pin 3. The connecting pin 3 of each of the end chain components 12 includes a main segment 32 inserted into the pin hole 124 and having a diameter (d2), an anchoring end segment 33 axially spaced apart from the main segment 32, extending outwardly of the pin hole 124, and having a diameter (d3), and a constricted neck 34 extending outwardly of the pin hole 124 and disposed between the main segment 32 and the anchoring end segment 33. The first connecting plate 2 has two spaced anchoring holes 212 each having a diameter (d1) that is originally smaller than the diameter (d2) of the main segment 32 and larger than the diameter (d3) of the anchoring end segment 33. The main segment 32 of the connecting pin 3 is force-fitted in a corresponding one of the anchoring holes 212 so that the end chain components 12 are joined to each other.

The anchoring plate 4 is anchored onto the constricted necks 34 of the connecting pins 3. The second connecting plate 11 is fixed to the main segments 32 of the connecting pins 3 outwardly of the pin holes 124. The first and second connecting plates 2, 11 are disposed on two opposite sides of the pin holes 124. Each of the first packing rings 36 is disposed around the main segment 32 of one of the connecting pins 3 and abuts against the first connecting plate 2. Each of the second packing rings 35 is disposed around the main segment 32 of one of the connecting pins 3 and abuts against the second connecting plate 11.

Figure 7:
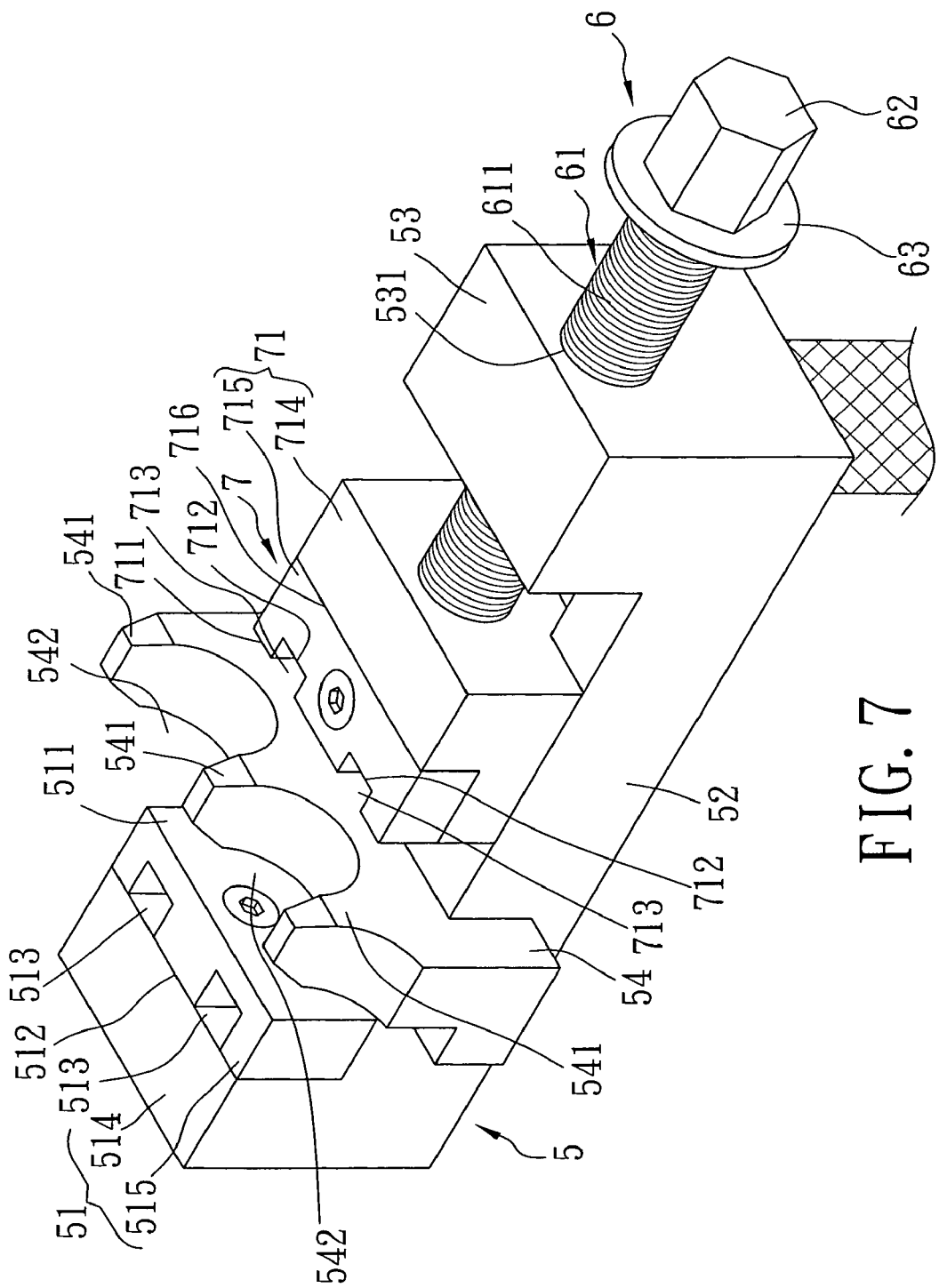
FIG. 7 is a perspective view of the first preferred embodiment of a tool device for assembling or disassembling the drive chain according to this invention.
Figure 8:
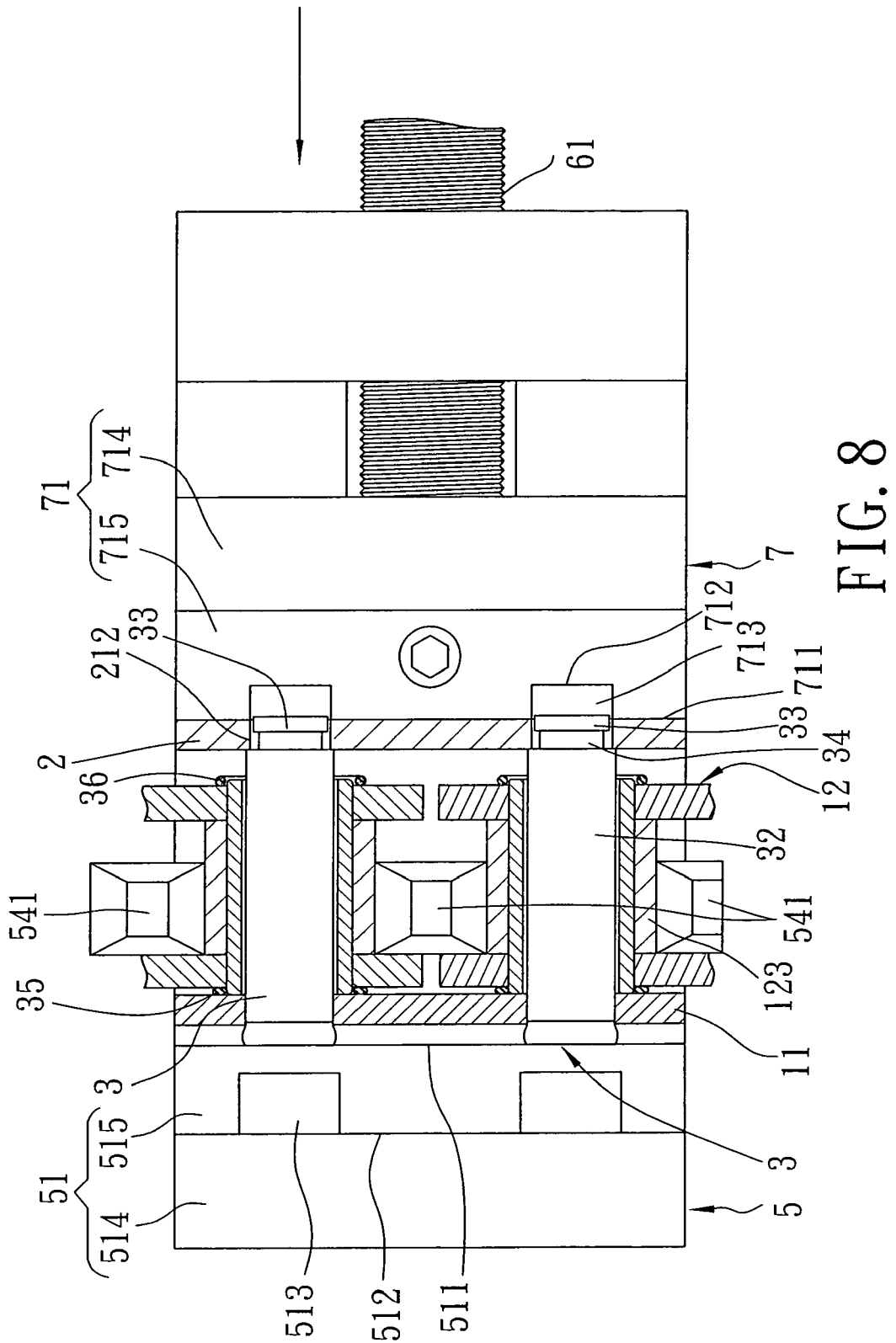
FIGS. 8 and 9 are fragmentary partly cross-sectional schematic views illustrating the operation of the first preferred embodiment of the tool device for assembling the preferred embodiment of the drive chain of the present invention.
Figure 9:
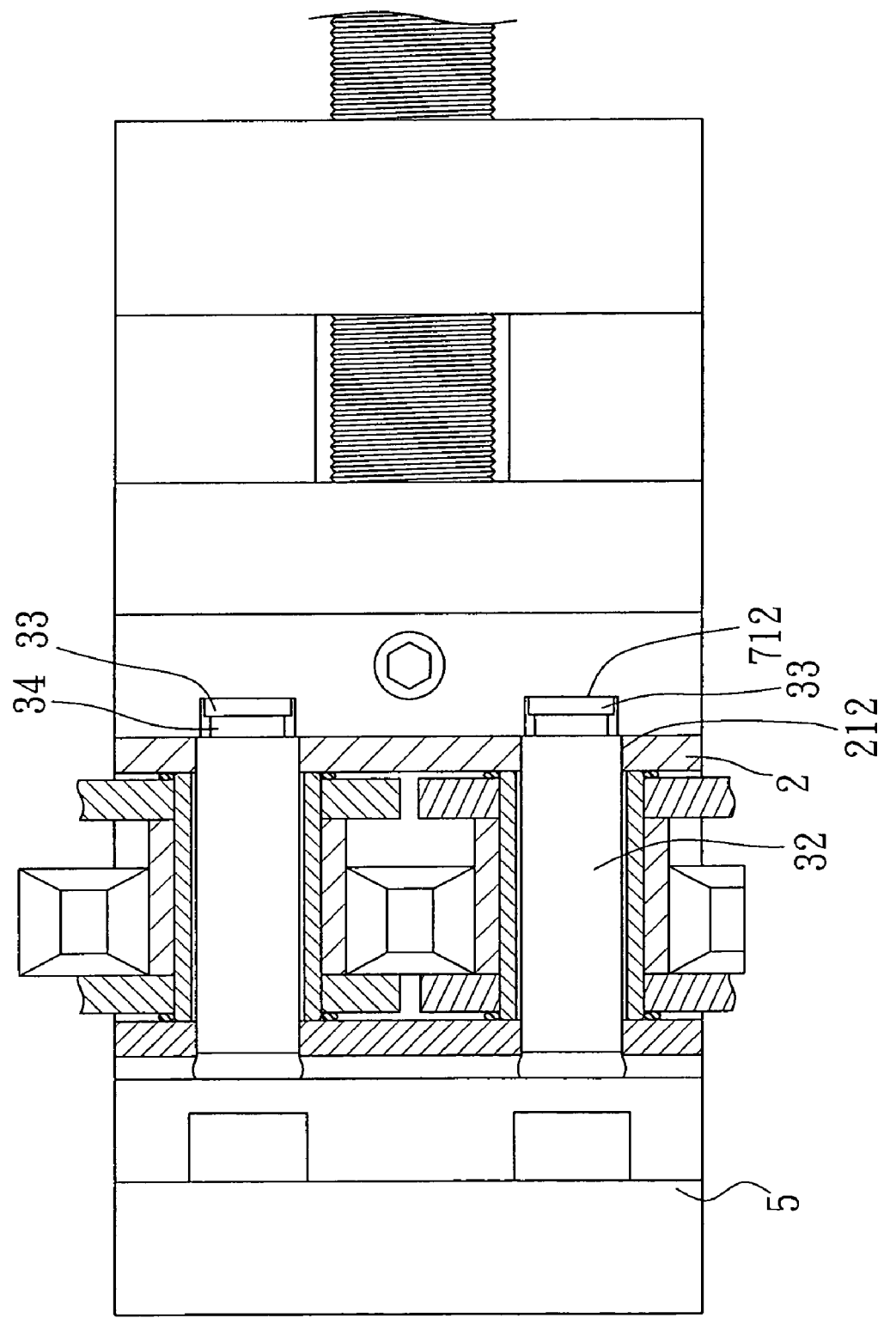

Referring to FIGS. 7 and 8, the first preferred embodiment of a tool device adapted for assembling or disassembling the end chain components 12 of the drive chain is shown to include a base seat assembly 5, a drive mechanism 6, and a pressing mechanism 7.

The base seat assembly 5 includes a first side wall 51, a positioning wall 54 spaced apart from the first side wall 51 and adapted to position the end chain components 12, a second side wall 53 disposed at one side of the positioning wall 54 opposite to the first side wall 51 and having a threaded hole 531, and a base wall 52 extending transversely to the first side wall 51, the positioning wall 54, and the second side wall 53. The first side wall 51 and the positioning wall 54 have bottom ends connected to the base wall 52. The positioning wall 54 has three aligned teeth 541 which are adapted to extend into the end chain components 12 and which define two spaced apart positioning grooves 542 adapted to position the end chain components 12, respectively.

The drive mechanism 6 includes a drive unit 61 movable on the base wall 52 relative to the base seat assembly 5 and disposed on one side of the positioning wall 54 opposite to the first side wall 51, an adjusting element 62 extending axially and outwardly from the drive unit 61, and a stop element 63 radially protruding from a junction of the adjusting element 62 and the drive unit 61. The drive unit 61 is mounted on the second side wall 53, and includes a threaded actuating shaft 611 extending threadedly through the threaded hole 531 of the second side wall 53.

The pressing mechanism 7 is mounted movably between the positioning wall 54 and the drive mechanism 6, and includes a pressing seat 71 actuated by the drive mechanism 6 to move on the base wall 52 of the base seat assembly 5 toward the first side wall 51 and adapted to press the end chain components 12 against the first side wall 51. The threaded actuating shaft 611 of the drive unit 61 is connected to the pressing seat 71. The positioning wall 54 and the pressing seat 71 are disposed between the first and second side walls 51, 53. The pressing seat 71 includes a first pressing face 711 facing and movable toward the positioning wall 54, and two spaced grooves 713 recessed from the first pressing face 711 and adapted to respectively receive the end chain components 12. The spaced grooves 713 of the pressing seat 71 are substantially aligned with the positioning grooves 542 of the positioning wall 54 along a moving direction of the pressing mechanism 7. Each of the grooves 713 has a stop surface 712. The first side wall 51 has a first abutting face 511 which faces the positioning wall 54 oppositely of the first pressing face 711 of the pressing seat 71, and which cooperates with the first pressing face 711 to apply pressure to the end chain components 12.

Referring to FIGS. 5, 7, 8, and 9, in assembling the end chain components 12 of the drive chain, the connecting pins 3 penetrate through the second connecting plate 11, the second packing rings 35, the inner chain plates 121, the bushings 122 on which the rollers 123 are sleeved, and the first packing rings 36 so that the main segments 32 of the connecting pins 3 extend out of the first packing rings 36 correspondingly. The first connecting plate 2 is then mounted on the connecting pins 3 so that the anchoring end segments 33 of the connecting pins 3 are received in the anchoring holes 212 of the first connecting plate 2.

The end chain components 12 of the drive chain are mounted between the first side wall 51 and the pressing seat 71 on the tool device so that the teeth 541 of the positioning wall 54 extend into the end chain components 12 to position the end chain components 12. The pressing seat 71 is actuated by rotating the adjusting element 62 of the drive mechanism 6 to move toward the first side wall 51 so that the first connecting plate 2 is pressed by the first pressing face 711 of the pressing seat 71 toward the first side wall 51 until the anchoring end segments 33 of the connecting pins 3 abut against the stop surfaces 712 of the pressing seat 71. The main segment 32 of the connecting pin 3 can be force-fitted in a corresponding one of the anchoring holes 212 of the first connecting plate 2 so that the end chain components 12 are thereby joined to each other. The drive chain is then removed from the tool device by rotating the adjusting element 62 of the drive mechanism 6 in a reverse direction to actuate the pressing seat 71 to move away from the first side wall 51. The anchoring plate 4 is anchored onto the constricted necks 34 of the connecting pins 3 to finish the assembly.

Figure 10:
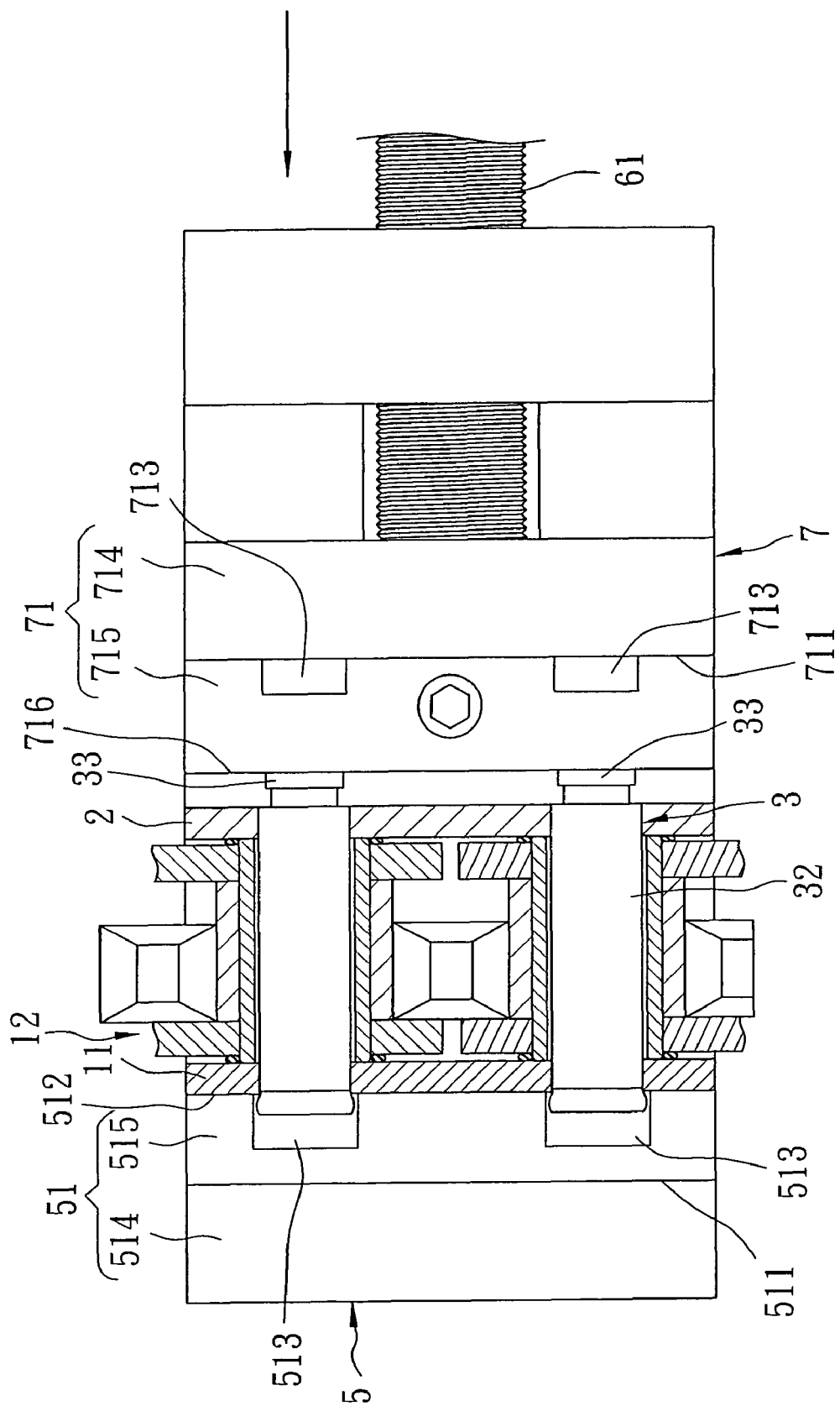
FIGS. 10 and 11 are fragmentary partly cross-sectional schematic views illustrating the operation of the first preferred embodiment of the tool device for disassembling the preferred embodiment of the drive chain of the present invention.
Figure 11:
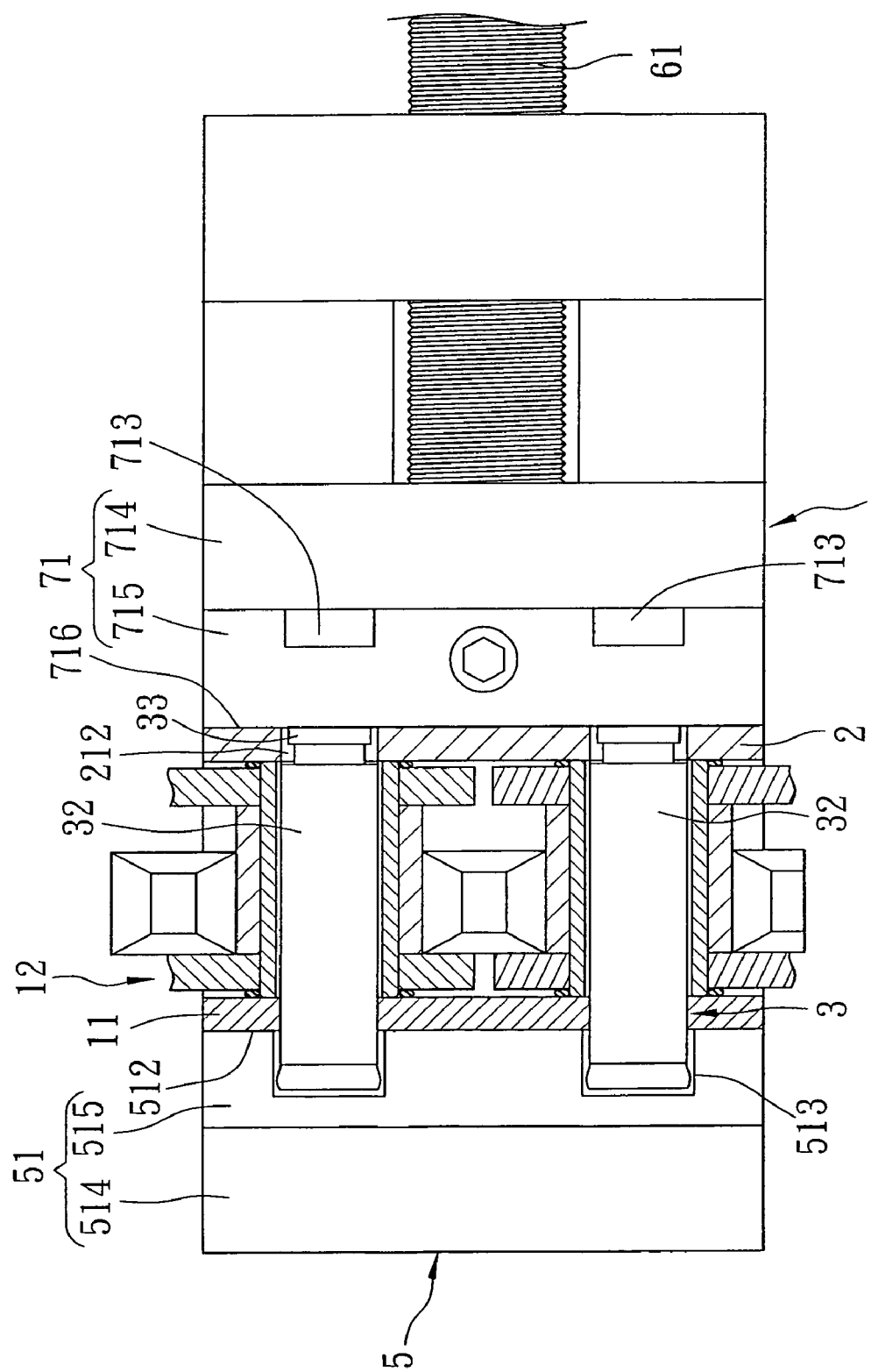

Alternatively, referring to FIGS. 10 and 11, the pressing seat 71 includes a second pressing face 716 adapted to press the end chain components 12. The first side wall 51 has a second abutting face 512 facing the second pressing face 716, and two spaced grooves 513 recessed from the second abutting face 512 and adapted to receive respectively the end chain components 12. The spaced grooves 513 of the first side wall 51 are substantially aligned with the positioning grooves 542 of the positioning wall 54 along the moving direction of the pressing mechanism 7. The second pressing face 716 of the pressing seat 71 cooperates with the second abutting face 512 and the grooves 513 of the first side wall 51 to apply pressure to the end chain components 12.

Referring to FIG. 7 again, the pressing seat 71 includes a fixed seat body 714 fixed to the drive unit 61 for simultaneous movement therewith, and a pressing body 715 detachably connected to the fixed seat body 714. The pressing body 715 has the first pressing face 711, the spaced grooves 713, and the second pressing face 716 opposite to the first pressing face 711. The first side wall 51 includes a fixed wall portion 514, and a detachable wall portion 515 detachably connected to the fixed wall portion 514. The detachable wall portion 515 has the first abutting face 511, the second abutting face 512 opposite to the first abutting face 511, and the spaced grooves 513 recessed from the second abutting face 512.

Referring to FIGS. 10 and 11, in disassembling the end chain components 12 of the drive chain, the pressing body 715 of the pressing seat 71 and the detachable wall portion 515 of the first side wall 51 are adjusted so that the second abutting face 512 and the spaced grooves 513 of the detachable wall portion 515 face toward the second pressing face 716 of the pressing body 715.

The anchoring plate 4 is removed from the constricted necks 34 of the connecting pins 3. The end chain components 12 of the drive chain are then mounted between the first side wall 51 and the pressing seat 71 on the tool device so that the second connecting plate 11 abuts against the second abutting face 512 of the detachable wall portion 515 and that the connecting pins 3 are aligned with the spaced grooves 513 of the detachable wall portion 515. The pressing seat 71 is actuated by rotating the adjusting element 62 of the drive mechanism 6 to move toward the first side wall 51 so that the anchoring end segments 33 of the connecting pins 3 are pressed by the second pressing face 716 of the pressing seat 71 toward the first side wall 51 until the second pressing face 716 abuts against the first connecting plate 2 so that the first connecting plate 2 is detached from the connecting pins 3. The drive chain is then removed from the tool device by rotating the adjusting element 62 of the drive mechanism 6 in a reverse direction to actuate the pressing seat 71 to move away from the first side wall 51. The end chain components 12 are disconnected from each other by removing the first connecting plate 2, the connecting pins 3, and the second connecting plate 11.

In view of the aforesaid, since the main segments 32 of the connecting pins 3 are fittingly inserted through the first connecting plate 2, the aforesaid disadvantage of the prior art can be avoided, and the mechanical strength of the first connecting plate 2 can be improved. Furthermore, the drive chain can be assembled and disassembled easily by the tool device.

Figure 12:
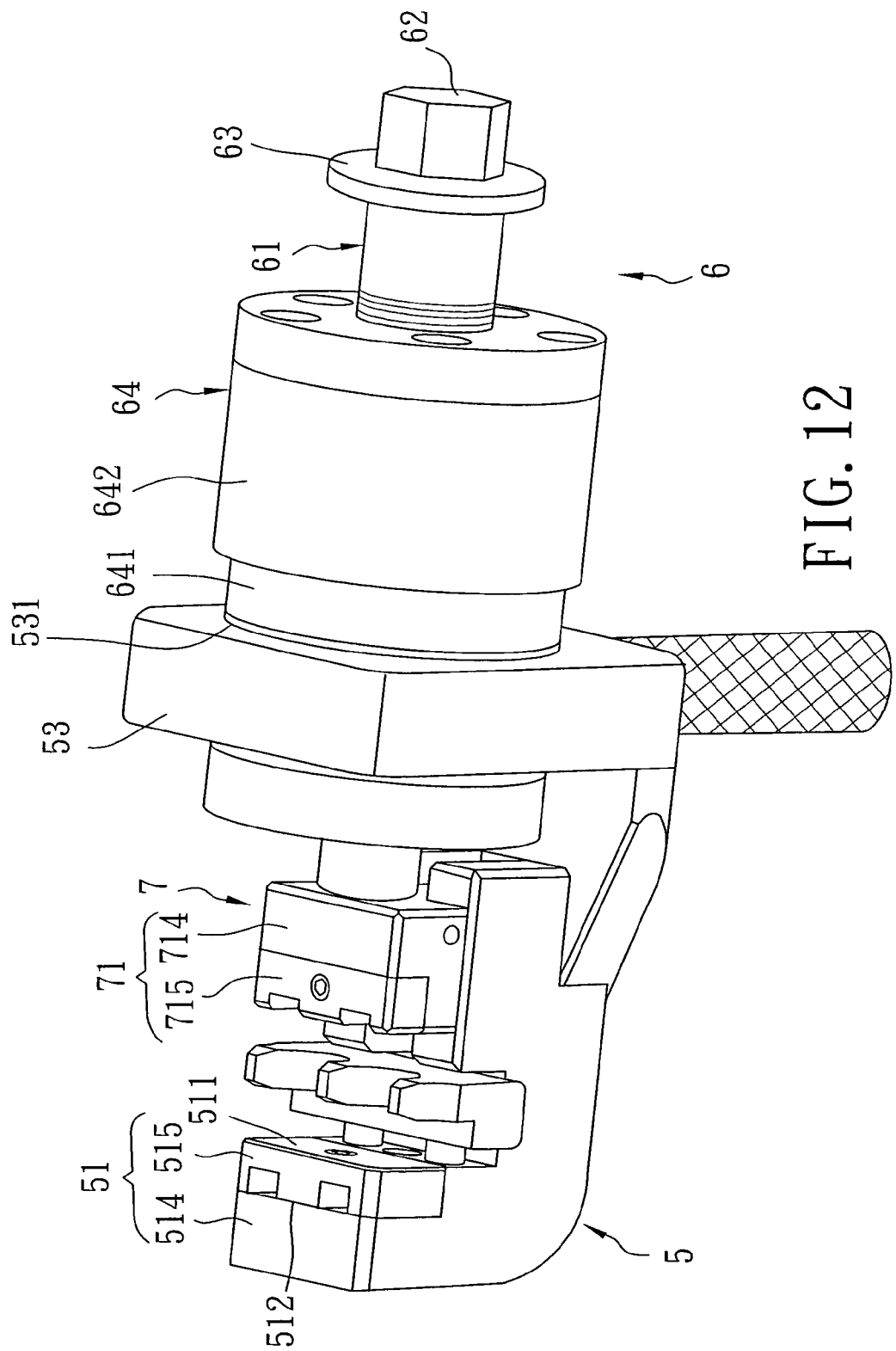
FIG. 12 is a perspective view of the second preferred embodiment of a tool device for assembling or disassembling the drive chain according to this invention.
Figure 13:
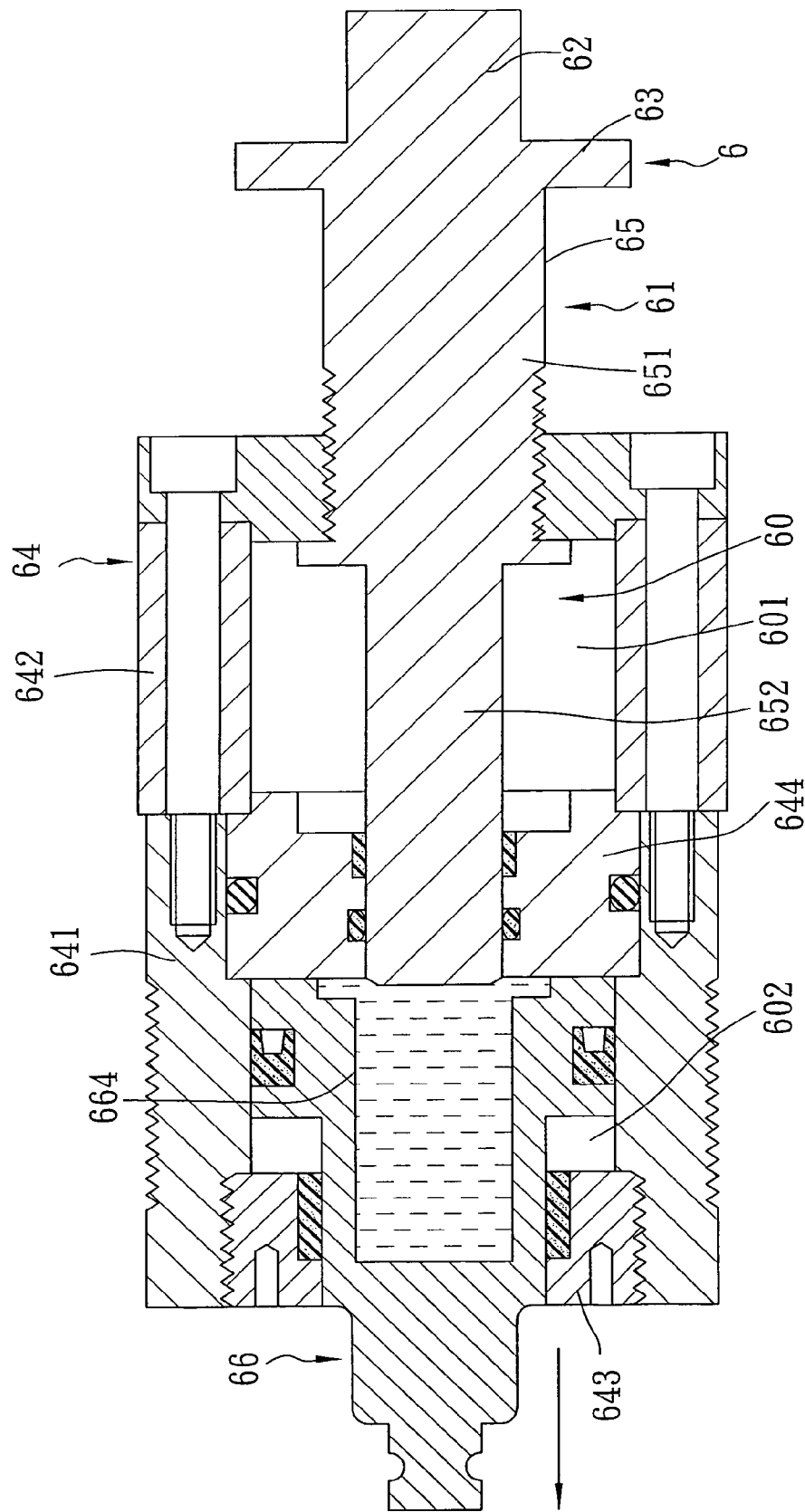
FIG. 13 is a fragmentary partly cross-sectional schematic view illustrating the operation of the second preferred embodiment of the tool device for assembling the preferred embodiment of the drive chain of the present invention.

Referring to FIGS. 12 and 13, the second preferred embodiment of the tool device according to this invention is shown to be similar to the first preferred embodiment except for the following.

The drive mechanism 6 further includes an adjusting seat 64 that is threadably engaged to the second side wall 53 of the base seat assembly 5, that is movable relative to the base seat assembly 5, and that has a receiving space 60. The adjusting seat 64 includes a first seat portion 641, a second seat portion 642 cooperating with the first seat portion 641 to define the receiving space 60, and an end cap 643 mounted on the second seat portion 642 opposite to the first seat portion 641. The first seat portion 641 extends threadedly through the threaded hole 531 of the second side wall 53 so that the adjusting seat 64 is axially movable relative to the base seat assembly 5. The drive unit 61 includes a threaded actuating shaft 65 extending outwardly from the receiving space 60 in a direction away from the base seat assembly 5 and movable relative to the adjusting seat 64, and an output shaft 66 mounted between the threaded actuating shaft 65 and the pressing seat 71, and extending from the adjusting seat 64 toward the pressing seat 71. The output shaft 66 defines a hydraulic reserving space 664 that contains a hydraulic fluid. The threaded actuating shaft 65 is operable to pressurize the hydraulic fluid so as to push the output shaft 66.

The adjusting seat 64 further includes a partition cap 644 mounted in the receiving space 60 and dividing the receiving space 60 into a first space portion 601 and a second space portion 602. The threaded actuating shaft 65 includes a threadably engaging segment 651 extending out of the adjusting seat 64 and threadably engaged to the second seat portion 642 of the adjusting seat 64, and a pushing segment 652 extending from the threadably engaging segment 651 to the partition cap 644. The hydraulic reserving space 664 is fluidly communicated with the second space portion 602 so that the output shaft 66 is axially movable in the second space portion 602.

Figure 14:
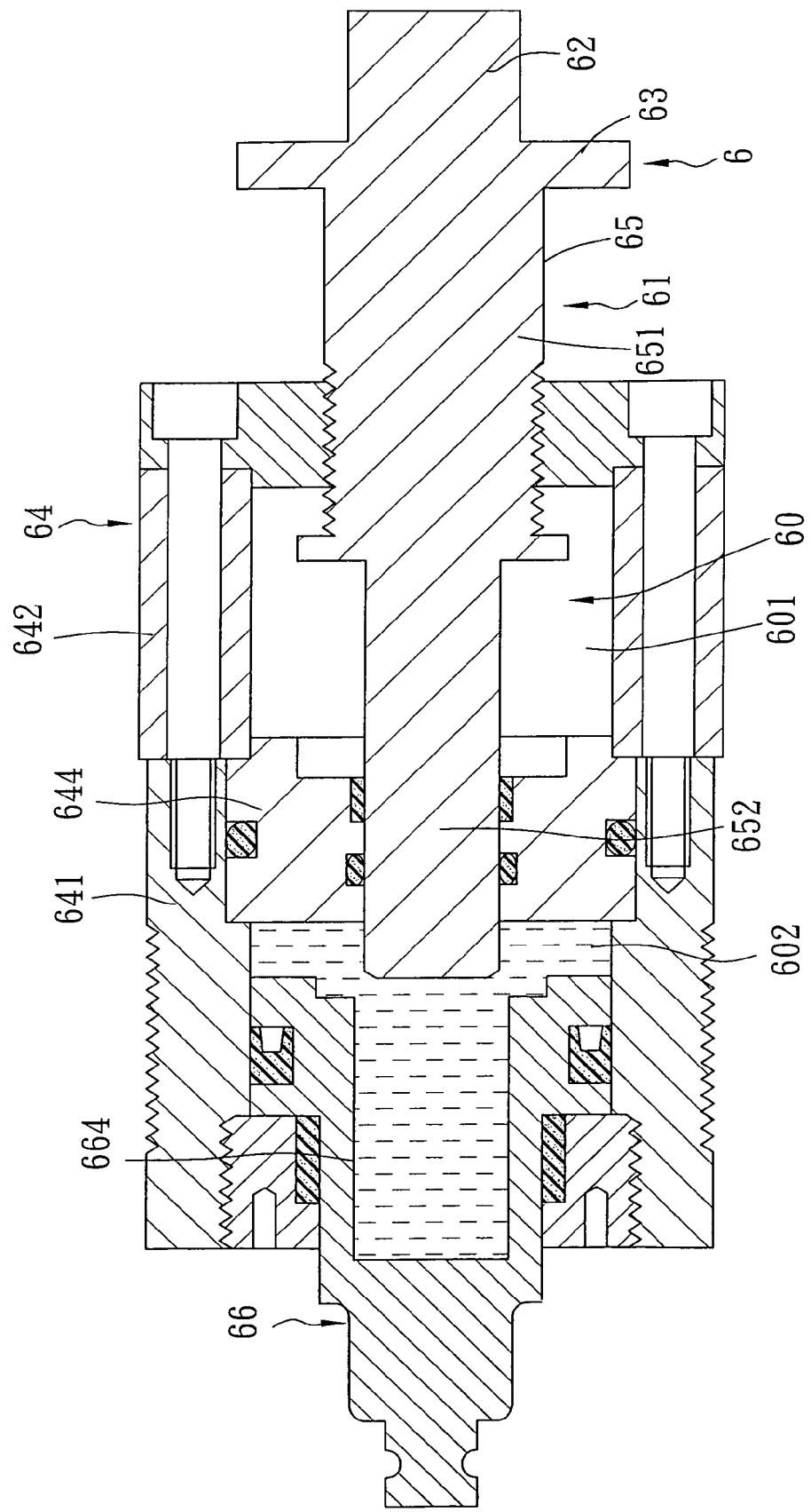
FIG. 14 is a fragmentary partly cross-sectional schematic view illustrating the operation of the second preferred embodiment of the tool device for disassembling the preferred embodiment of the drive chain of the present invention.

Referring to FIGS. 13 and 14, in assembling the end chain components 12 of the drive chain using the second preferred embodiment of the tool device, the end chain components 12 of the drive chain are mounted between the first side wall 51 and the pressing seat 71 on the tool device in a manner similar to the tool device of the previous embodiment. The drive mechanism 6 is operated in a two-stage manner to actuate the pressing seat 71 to move toward the first side wall 51 to finish the assembly. The adjusting seat 64 is rotated by hand to actuate the drive unit 61 and the pressing seat 71 to move toward the first side wall 51 until the pressing seat 71 abuts against the first connecting plate 2. The adjusting element 62 of the drive mechanism 6 is then rotated to move the threaded actuating shaft 65 toward the first side wall 51 so as to pressurize the hydraulic fluid to push the output shaft 66 toward the first side wall 51. As a result, the pressing seat 71 is further actuated to move toward the first side wall 51 so that the first connecting plate 2 is pressed by the first pressing face 711 of the pressing seat 71 toward the first side wall 51 until the anchoring end segments 33 of the connecting pins 3 abut against the stop surfaces 712 of the pressing seat 71. The main segment 32 of the connecting pin 3 can be force-fitted in a corresponding one of the anchoring holes 212 of the first connecting plate 2 so that the end chain components 12 are thereby joined to each other.

In disassembling the end chain components 12 of the drive chain using the second preferred embodiment of the tool device, the disassembly process can be accomplished in a manner similar to that illustrated in FIGS. 10 and 11 but with the aforesaid two-stage manner of the drive mechanism 6.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A tool device adapted for assembling or disassembling two end chain components of a drive chain, said tool device comprising:
   a base seat assembly including a first side wall, and a positioning wall spaced apart from said first side wall and adapted to position the end chain components;
   a drive mechanism including a drive unit movable relative to said base seat assembly and disposed on one side of said positioning wall opposite to said first side wall; and
   a pressing mechanism mounted movably between said positioning wall and said drive mechanism, and including a pressing seat actuated by said drive mechanism to move toward said first side wall and adapted to press the end chain components against said first side wall, wherein said pressing seat includes a first pressing face, and two spaced grooves recessed from said first pressing face and adapted to respectively receive the end chain components, each of said grooves having a stop surface, said first side wall having a first abutting face facing said first pressing face and cooperating with said first pressing face to apply pressure to the end chain components.

2. The tool device as claimed in claim 1, wherein said base seat assembly further includes a second side wall disposed at one side of said positioning wall opposite to said first side wall and having a threaded hole, and said drive unit includes a threaded actuating shaft extending threadedly through said threaded hole.

3. The tool device as claimed in claim 1, wherein said base seat assembly further includes a second side wall disposed at one side of said positioning wall opposite to said first side wall and having a threaded hole, said drive mechanism further including an adjusting seat that is threadably engaged to said second side wall of said base seat assembly, that is movable relative to said base seat assembly, and that has a receiving space, said drive unit including a threaded actuating shaft extending outwardly from said receiving space in a direction away from said base seat assembly and movable relative to said adjusting seat, and an output shaft mounted between said threaded actuating shaft and said pressing seat, and extending from said adjusting seat toward said pressing seat, said output shaft defining a hydraulic reserving space that contains a hydraulic fluid, said threaded actuating shaft being operable to pressurize said hydraulic fluid so as to push said output shaft.

4. The tool device as claimed in claim 3, wherein said adjusting seat includes a partition cap mounted in said receiving space and dividing said receiving space into a first space portion and a second space portion, said threaded actuating shaft including a threadably engaging segment extending out of said adjusting seat and threadably engaged to said adjusting seat, and a pushing segment extending from said threadably engaging segment to said partition cap, said hydraulic reserving space being fluidly communicated with said second space portion so that said output shaft is axially movable in said second space portion.

5. The tool device as claimed in claim 1, wherein said drive mechanism further includes an adjusting element extending axially and outwardly from said drive unit, and a stop element radially protruding from a junction of said adjusting element and said drive unit.

6. The tool device as claimed in claim 1, wherein said positioning wall includes at least one protruding tooth adapted to extend into the end chain components.

7. A tool device adapted for assembling or disassembling two end chain components of a drive chain, said tool device comprising:
a base seat assembly including a first side wall, and a positioning wall spaced apart from said first side wall and adapted to position the end chain components;
a drive mechanism including a drive unit movable relative to said base seat assembly and disposed on one side of said positioning wall opposite to said first side wall; and
a pressing mechanism mounted movably between said positioning wall and said drive mechanism, and including a pressing seat actuated by said drive mechanism to move toward said first side wall and adapted to press the end chain components against said first side wall, wherein said pressing seat includes a second pressing face adapted to press the end chain components, said first side wall having a second abutting face facing said second pressing face, and two spaced grooves recessed from said second abutting face and adapted to receive respectively the end chain components, said second pressing face of said pressing seat cooperating with said second abutting face and said grooves of said first side wall to apply pressure to the end chain components.

8. The tool device as claimed in claim 1, wherein said pressing seat includes a fixed seat body fixed to said drive unit for simultaneous movement therewith, and a pressing body detachably connected to said fixed seat body, said pressing body having said first pressing face, said spaced grooves, and a second pressing face opposite to said first pressing face, said first side wall including a fixed wall portion, and a detachable wall portion detachably connected to said fixed wall portion, said detachable wall portion having said first abutting face, a second abutting face opposite to said first abutting face, and two spaced grooves recessed from said second abutting face.

9. A tool device adapted for assembling or disassembling two end chain components of a drive chain, said tool device comprising:
a base seat assembly including a first side wall, and a positioning wall spaced apart from said first side wall and adapted to position the end chain components;
a drive mechanism including a drive unit movable relative to said base seat assembly and disposed on one side of said positioning wall opposite to said first side wall; and
a pressing mechanism mounted movably between said positioning wall and said drive mechanism, and including a pressing seat actuated by said drive mechanism to move toward said first side wall and adapted to press the end chain components against said first side wall, wherein said positioning wall has three aligned teeth which define two spaced apart positioning grooves adapted to position the end chain components, respectively, said first side wall including a first abutting face facing said positioning wall, said pressing seat having a first pressing face facing said positioning wall oppositely of said first abutting face, one of said first side wall and said pressing seat being recessed to form two spaced grooves which are substantially aligned with said positioning grooves of said positioning wall along a moving direction of said pressing mechanism.

10. The tool device as claimed in claim 1, wherein said base seat assembly further includes a base wall extending transversely to said first side wall and said positioning wall, said first side wall and said positioning wall having bottom ends connected to said base wall, said pressing seat and said drive unit being mounted movably on said base wall, said first side wall having a first abutting face facing said positioning wall, said first pressing face facing said positioning wall oppositely of said first abutting face and movable toward said positioning wall.

11. The tool device as claimed in claim 10, wherein said base seat assembly further includes a second side wall that is opposite to said first side wall, said positioning wall and said pressing seat being disposed between said first and second side walls, said drive unit being mounted on said second side wall and includes a threaded actuating shaft.

12. The tool device as claimed in claim 11, wherein said threaded actuating shaft extends threadedly through said second side wall and is connected to said pressing seat.

13. The tool device as claimed in claim 3, wherein said drive mechanism further includes a hydraulic fluid, and an output shaft driven by said hydraulic fluid, said threaded actuating shaft being operable to pressurize said hydraulic fluid.

* * * * *